US006456927B1

(12) United States Patent
Frankowski et al.

(10) Patent No.: US 6,456,927 B1
(45) Date of Patent: Sep. 24, 2002

(54) SPECTRAL KNOCK DETECTION METHOD AND SYSTEM THEREFOR

(75) Inventors: David Frankowski, Woodhaven, MI (US); Neil J. Adams, West Bloomfield, MI (US); Steven L. Plee, Brighton, MI (US); Donald J. Remboski, Jr., Dearborn, MI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/035,348

(22) Filed: Mar. 22, 1993

(51) Int. Cl.[7] .............................. G06F 19/00; G06G 7/70
(52) U.S. Cl. ........................ 701/111; 701/101; 701/102; 73/35.01; 73/35.04; 73/35.03; 73/117.3; 123/406.21; 123/406.29; 123/406.34; 123/406.37
(58) Field of Search ...................... 364/431.01–431.12; 123/425, 436, 479, 419, 435, 406, 406.29, 406.16, 406.21, 406.38, 406.39, 406.34, 406.37; 73/35, 116, 587, 654, 652, 579, 35.04, 117.3, 35.01, 35.03, 35.07, 35.09; 701/101, 102, 111

(56) References Cited

U.S. PATENT DOCUMENTS

| 4,271,469 A | * | 6/1981 | Kawai et al. .......... 364/431.08 |
| 4,271,799 A | * | 6/1981 | Kato et al. ................... 123/425 |
| 4,331,117 A | * | 5/1982 | Ginsburgh .................. 123/425 |
| 4,345,558 A |   | 8/1982 | Yamaguchi et al. ........ 123/425 |
| 4,373,378 A |   | 2/1983 | Fukishiro et al. .............. 73/35 |

(List continued on next page.)

FOREIGN PATENT DOCUMENTS

| DE | 3506114 | 9/1986 |
| DE | 3911554 | 10/1989 |
| JP | 4309871 | 11/1992 |

OTHER PUBLICATIONS

SAE Technical Paper Series, 871912 Passenger Car Meeting and Exposition Dearborn, MI Oct. 19–22, 1987.
SAE Technical Paper Series, Engine Knock Detection Using Multi–Spectrum Method, International Congress & Exposition Detroit, MI Feb. 24–28, 1992.
Knock Detection System for Spark Igntion Engines, 905009, G. Ghislo, Marelli Autornica, F. Maloberti, Universita Di Pavia Polito, F.Salerno, Marelliautronica.

(List continued on next page.)

Primary Examiner—Jacques H. Louis-Jacques
(74) Attorney, Agent, or Firm—Phillip H. Melamed; Nicholas C. Hopman (57) ABSTRACT

A spectral method, and corresponding system, for knock detection includes acquiring (603) spectral energy associated with vibration caused by a knocking condition from a running engine. Preferably, a sampled data system (105) acquires the spectral energy by converting an output from an accelerometer (101) into data samples (103) in a digital form. Then from the acquired spectral energy, a knock variable is derived from magnitudes of spectral components, representing a characteristic of a combustion chamber located within the running engine. In a preferred embodiment the knock variable is derived from magnitudes of spectral components related by ratios corresponding to Bessel function coefficients. The preferred embodiment includes a Digital Signal Processor (109) applying a Fast Fourier Transform method (503) to estimate a spectral content used to determine the knock variable. Then, a knock indication is provided (509) when the knock variable exceeds a magnitude of a predetermined threshold (507). Other embodiments include provision for providing a knock indication when a knock variable (703) derived from magnitudes of individual spectral components corresponding to characteristic knock spectra associated with acquired spectral energy exceeds a magnitude of a trended time weighted version of the knock variable by a predetermined magnitude (709).

28 Claims, 7 Drawing Sheets

U.S. PATENT DOCUMENTS

| | | | |
|---|---|---|---|
| 4,384,473 A | * | 5/1983 | Brandt .................... 73/35.06 |
| 4,455,862 A | * | 6/1984 | Takeuchi ..................... 73/35 |
| 4,467,634 A | | 8/1984 | Rohde et al. ................. 73/35 |
| 4,508,079 A | | 4/1985 | Komurasaki ............... 123/425 |
| 4,584,869 A | * | 4/1986 | Frodsham ..................... 73/35 |
| 4,637,247 A | | 1/1987 | Dreyer et al. ................. 73/35 |
| 4,846,130 A | | 7/1989 | Jensen ...................... 123/425 |
| 4,856,480 A | | 8/1989 | Nakajima et al. .......... 123/425 |
| 4,881,401 A | | 11/1989 | Cockerham ................... 73/35 |
| 4,887,574 A | * | 12/1989 | Kuroiwa et al. ............ 123/425 |
| 4,991,553 A | | 2/1991 | Kurihara .................... 123/425 |
| 5,052,214 A | | 10/1991 | Dils ....................... 364/431.01 |
| 5,069,071 A | * | 12/1991 | McBrien et al. .............. 73/654 |
| 5,076,235 A | * | 12/1991 | Nagel et al. ........... 364/431.08 |
| 5,088,044 A | * | 2/1992 | Matsuura ............... 364/431.08 |
| 5,092,160 A | | 3/1992 | Ueda et al. .................... 73/35 |
| 5,121,729 A | * | 6/1992 | Hashimoto et al. .... 364/431.08 |
| RE34,234 E | * | 4/1993 | Kuroiwa et al. ............ 123/425 |
| 5,201,292 A | * | 4/1993 | Grajski et al. .............. 123/425 |
| 5,206,809 A | * | 4/1993 | Iwakiri et al. ......... 364/431.08 |
| 5,230,316 A | * | 7/1993 | Ichihara et al. ............. 123/425 |
| 5,267,164 A | * | 11/1993 | Miyama ................ 364/431.08 |
| 5,373,448 A | * | 12/1994 | Katogi et al. .......... 364/431.08 |
| 5,387,253 A | * | 2/1995 | Remboski, Jr. et al. .... 73/117.3 |
| 5,400,644 A | * | 3/1995 | Remboski, Jr. et al. . 364/431.08 |

OTHER PUBLICATIONS

SAE Technical Paper Series, Examination of Methods Used to Characterize Engine Knock, International Congress & Exposition Detroit, MI Feb. 24–28, 1992.

* cited by examiner

| Bessel Coefficient (341) | Bin (335) | Frequency (337) | Amplitude (339) |
|---|---|---|---|
| | 512 | 50,000 | 0 |
| | 511 | 49,902 | 0 |
| | 510 | 49,805 | 0 |
| | ⋮ | ⋮ | ⋮ |
| | 196 | 19,148 | 0 |
| 3.81 | 195 | 19,050 | 16 |
| | 194 | 18,952 | 0 |
| | ⋮ | ⋮ | ⋮ |
| | 179 | 17,498 | 0 |
| 3.48 | 178 | 17,400 | 20 |
| | 177 | 17,302 | 0 |
| | ⋮ | ⋮ | ⋮ |
| | 149 | 14,598 | 0 |
| 2.90 | 148 | 14,500 | 26 |
| | 147 | 14,402 | 0 |
| | ⋮ | ⋮ | ⋮ |
| | 149 | 14,548 | 0 |
| 2.89 | 148 | 14,450 | 34 |
| | 147 | 14,352 | 0 |
| | ⋮ | ⋮ | ⋮ |
| | 118 | 11,498 | 0 |
| 2.28 | 117 | 11,400 | 43 |
| | 116 | 11,302 | 0 |
| | ⋮ | ⋮ | ⋮ |
| | 107 | 10,498 | 0 |
| 2.08 | 106 | 10,400 | 55 |
| | 105 | 10,302 | 0 |
| | ⋮ | ⋮ | ⋮ |
| | 86 | 8,398 | 0 |
| 1.66 | 85 | 8,300 | 71 |
| | 84 | 8,202 | 0 |
| | ⋮ | ⋮ | ⋮ |
| | 52 | 5,098 | 0 |
| 1.00 | 51 | 5,000 | 91 |
| | 50 | 4,902 | 0 |
| | ⋮ | ⋮ | ⋮ |
| | 3 | 293 | 0 |
| | 2 | 195 | 0 |
| | 1 | 97.65625 | 0 |

323

$\sum$ = 1ST CORRELATION RESULT

SPECTRAL KNOCK DETECTION METHOD AND SYSTEM THEREFOR

FIELD OF THE INVENTION

This invention is related to the field of knock detection relating to an internal combustion engine, and more specifically to a system for determining a knock condition while measuring spectral energy sensed by an engine coupled knock spectra responsive sensor.

BACKGROUND OF THE INVENTION

Engine control systems with knock detection capability, are used to detect and eliminate knocking conditions, characteristic of the operation of internal combustion engines. Eliminating a knocking condition is important because, left unchecked engine power and efficiency will suffer, and combustion chamber and spark plugs will be damaged.

Knock detection systems typically use an accelerometer based sensor mounted on an engine for converting engine vibration into an electrical signal. This electrical signal includes a broad spectrum of information about the engine's operating condition. Included in this signal is the knock information, and extraneous information known as noise. When knocking occurs, the knock component of the signal results from an initial shock wave followed by gas oscillations in the combustion chamber during combustion. The noise component of the signal generally is significant and can be large enough to mask the knock component. The noise component may be comprised of several sources including piston slap vibration, valve closing vibration, and other systemic noise.

Various techniques have been applied to extract the knock information from the electrical signal representative of engine vibration, however, these techniques have been limited in accuracy and reliability. The knock component of the signal occurs at several different frequencies and the energy level shifts in emphasis between those frequencies. This partially is related to, gas temperature, and combustion chamber geometry. Moreover, there are variations from engine to engine and from cylinder to cylinder within the same engine that affect the relationship of the knock component to the noise component.

To provide for this range of conditions typical knock detection schemes use a broadband bandpass filter to extract knock information from the broadband electrical signal. Some schemes include engine crank angle based windowing, to restrict the analysis of knock to when it could likely occur in the combustion cycle. Other schemes attempt to improve the signal-to-noise ratio of the measurement by employing a second, or noise, bandpass filter having a passband located distant to the passband of the knock bandpass filter. The output of this noise bandpass filter is then subtracted from the output of the knock bandpass filter. The concept here is that the noise bandpass filter will indicate the level of noise signal located apart from the knock bandpass filter. This assumes that noise is broadband, and that the noise component in the knock band is of substantially the same magnitude. Thus, by subtracting the output of the noise bandpass filter from the output of the knock bandpass filter a more accurate representation of the knock component may be obtained.

This scheme is defective for several reasons, including that the filters intrinsically have a phase delay error. When the noise is subtracted this error detracts from accurately canceling the noise component of the signal. Further, since the noise band is located apart, only the noise located apart from the characteristic knock frequencies can be detected. In fact, the noise is not really broadband and there can be substantial noise located close to the characteristic knock frequencies that will not be canceled in this scheme. Also, with present schemes, extensive calibration is required to determine for each engine type a characteristic knock frequency, and if used, appropriate crank angle window, and a knock threshold. Additionally, as the engine speed increases, the systemic noise content increases substantially, and current systems perform inadequately.

What is needed is an improved system for detecting knock in internal combustion engines that is more reliable, and accurate, can detect knock at high engine speeds, requires minimum calibration and can be easily applied to different engine families.

DETAILED DESCRIPTION OF PREFERRED EMBODIMENTS

In the embodiments disclosed herein a spectral estimate of energy associated with vibration caused by a knocking condition sensed from a running engine provides a knock variable. A knock indication is provided when a magnitude of this knock variable exceeds a magnitude of a threshold.

In a preferred embodiment, an improved method of knock detection acquires spectral energy from a running engine. Then, from the acquired spectral energy, a knock variable derived from magnitudes of spectral components related to each other by ratios corresponding to Bessel function coefficients representing a characteristic of a combustion chamber located within the running engine is provided. Then, a knock indication is provided when the provided knock variable exceeds a magnitude of a predetermined threshold.

In an alternative embodiment another improved method of knock detection acquires spectral energy from a running engine. Then, a knock variable is derived from magnitudes of individual spectral components corresponding to characteristic knock spectra. In the alternative embodiment, the knock variable is provided composed of a summation of magnitudes of individual spectral components corresponding to characteristic knock spectra. Relationships other than a simple summation of magnitudes will also provide useful information as disclosed later. With this information, a knock indication is provided when the knock variable exceeds a magnitude of a trended time weighted version of the knock variable by a predetermined magnitude.

The preferred and alternative embodiments including both method steps and corresponding system are presented below. But first it would be instructive to briefly review some theory surrounding the physics of a combustion process in an engine's combustion chamber.

When a knocking condition exists in a running engine, spectra characteristic of vibrations resulting from an initial shock wave followed by gas oscillations are generated in a combustion chamber.

This phenomena is both deterministic and repeatable. An acoustic model of a combustion chamber, represented by the following equation, may be used to model the anticipated knock phenomena related spectral behavior.

$$f_{m,s} = \frac{C\sqrt{T}}{\pi D} \cdot x_{m,s} \qquad \text{EQUATION 1}$$

where:

$f_{m,s}$=frequency of mth circumferential, sth order radial vibration

C=phase velocity constant, (19.2 for the system modeled herein)

T=absolute temperature of gas in the combustion chamber

D=combustion chamber bore diameter $x_{m,s}$=x at the sth peak of the mth order Bessel function, $J_m(x)$ Note that the phase velocity constant C is approximately constant over a given combustion cycle, but will vary somewhat from combustion cycle to combustion cycle and with engine running conditions such as a change in engine speed and a change in engine load.

When various values of the mth circumferential, sth order radial vibration are substituted the dependent variable $x_{m,s}$ can be derived as illustrated in the following table.

TABLE 1

| m,s | $X_{m,s}$ | $X_{m,s}/x_{1,1}$ |
| --- | --- | --- |
| 1,1 | 1.84 | 1.00 |
| 2,1 | 3.05 | 1.66 |
| 3,1 | 4.20 | 2.28 |
| 4,1 | 5.32 | 2.89 |
| 5,1 | 6.42 | 3.48 |
| 0,2 | 3.83 | 2.08 |
| 1,2 | 5.33 | 2.90 |
| 0,3 | 7.02 | 3.81 |

The resulting spectral energy $f_{m,s}$ is attributable to gas oscillations in the combustion chamber. This relationship is disclosed by C. S. Draper in his treatise "Pressure Waves Accompanying Detonation in the Internal Combustion Engine" published in the Journal of Aeronautical Science, Vol. 5, Number 6, pages 219–226, in April of 1938. Further information describing this known phenomena can be found in the following papers published by The Society of Automotive Engineers. SAE Technical Paper Series No. 871912, entitled "Detection of Higher Frequency Vibration to Improve Knock Controllability", authored by Norihiko Nakamura, Eishi Ohno, Masanobu Kanamaru, and Tomoyuki Funayama, presented at a conference dated Oct. 19–22, 1987. And also, SAE Technical Paper Series No. 920808, entitled "Examination of Methods Used to Characterize Engine Knock", authored by Paulius V. Puzinauskas, presented at a conference dated Feb. 24–28, 1992.

A fundamental knocking frequency, associated with spectra characteristic of vibration resulting from an engine knocking condition, is typically located between 5,000 Hz and 7,500 Hz for most engines. A relatively small shift in this fundamental knocking frequency can be expected in response to various changes in engine operating conditions on a particular engine including the aforementioned gas temperature. Armed with this information, one may construct a new table based on the relationship show in Table 1 as follows.

TABLE 2

| m,s | $x_{m,s}$ | $x_{m,s}/x_{1,1}$ | 5,000 Hz | 7,500 Hz |
| --- | --- | --- | --- | --- |
| 1,1 | 1.84 | 1.00 | 5,000 | 7,500 |
| 2,1 | 3.05 | 1.66 | 8,000 | 12,450 |
| 3,1 | 4.20 | 2.28 | 11,400 | 17,100 |
| 4,1 | 5.32 | 2.89 | 14,450 | 21,675 |
| 5,1 | 6.42 | 3.48 | 17,400 | 26,100 |
| 0,2 | 3.83 | 2.08 | 10,400 | 15,600 |
| 1,2 | 5.33 | 2.90 | 14,500 | 21,750 |
| 0,3 | 7.02 | 3.81 | 19,050 | 28,575 |

The fourth and fifth columns represent the various frequencies corresponding to the Bessel predicted ratios found in column three for the two outermost expected fundamental frequencies of 5,000 Hz and 7,500 Hz. Of course, one could also determine the corresponding frequencies predicted by the Bessel function ratios for other fundamental frequencies by computation.

In the preferred embodiment, observed spectral energy extracted from a running engine is correlated with the above described relationship. That is, the spectral energy is measured and categorized into frequency related classifications. Then, using the predicted Bessel function ratios a high incidence of correlation is sought out. When the correlation result is of a sufficient magnitude, a knock indication is provided. The method will be disclosed below, but first an understanding of the overall system and its constituent components will be disclosed as follows.

Figure 1:
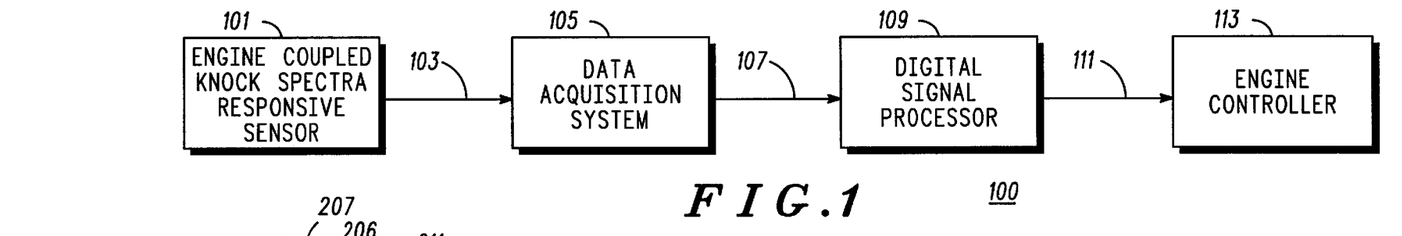
FIG. 1 is a system block diagram illustrating several high level functions, in accordance with the invention.

Starting with FIG. 1, a system block diagram shows an engine coupled knock spectra responsive sensor 101. In the embodiments disclosed herein this sensor is an engine mounted accelerometer. Other sensors that output spectral energy relating to a knocking condition during a combustion process may be substituted for the accelerometer 101. Those skilled in the art will recognize various optical, in-cylinder pressure, and flame ionization sensor technologies that may be applied. This accelerometer 101 outputs a signal 103 containing spectral energy representative of energy associated with vibration caused by a combustion process in a running engine.

The signal 103 is coupled into a data acquisition system 105 for conversion from a continuous time analog signal into a discrete time digital representation of the signal 103. This discrete time digital signal is shown at an output of a data acquisition system 105 by reference number 107. The data acquisition system 105 includes a low pass anti-aliasing filter coupled to an analog to digital converter for converting the signal 103 from its continuous time analog form to the discrete time digital form convenient to the system described herein. It also has a timing controller microcoded with various method steps for determining a sampling plan for the analog to digital converter described later. In the embodiments described herein a 12 bit resolution 100 kHz conversion rate capable analog to digital converter is used. Of course, other analog to digital converter conversion resolutions and conversion rates may be used. Those skilled in the art will recognize many different techniques for providing this analog to digital converter, anti-aliasing filter and timing controller.

A control aspect determined by the timing controller of the data acquisition system 105, is different for the different embodiments described herein. In the preferred embodiment, the data acquisition system 105 is controlled to provide a discrete time digital signal as shown by reference number 107, representative of spectral energy associated with the signal 103, on a periodic basis. The discrete time digital signal periodically provided will be termed hereinafter as a data set. This data set has a variable quantity of data samples provided at a fixed sample rate. The number of samples in the variable quantity of data samples will be dependent on engine angular velocity, or engine speed. In this case, the data samples are provided at fixed 10 $\mu$S intervals. A sampling schedule for the data set provides this data set synchronous proximate a predetermined crank angle interval, typically zero to forty degrees after top dead center of a firing cylinder. This is commonly known as crank angle windowing. If a knocking condition is present in a particular cylinder's combustion chamber, then it will typically occur during a period synchronous proximate zero to forty degrees after top dead center of a firing cylinder. To minimize a performance burden on a hardware platform to be detailed later, the data sets are only provided during a time that a knocking condition can potentially occur. For a six cylinder 4-stroke engine this data set will be provided once from each of the six cylinders every two engine revolutions. This results in 111 samples at 6,000 RPM and 1,111 samples at 600 RPM over a forty degree window, at the fixed 10 $\mu$S rate.

Synchronizing systems to affect this operation are well known in the art of engine design and therefore are not duplicated here. The data acquisition system 105 outputs the data set reflective of spectral energy provided by the sensor 101 in a digital format to a digital signal processor 109.

The digital signal processor or DSP 109, is microcoded with software emulating method steps described later. In this case a Motorola DSP56001 device is used. The Motorola DSP56001 has the capability of executing over ten million instructions per second, and with 24 bit wide data path provides 144 dB of dynamic range. Of course, those skilled in the art will recognize other equivalently useful DSP devices, or hardwired approaches vs. microcoded approaches. The DSP 109, after executing to be provided method steps, outputs a knock indication represented by reference number 111. This knock indication 111 may be provided to an engine controller 113 for further processing.

In the preferred embodiment, the knock detection system is described using discrete time signal processing elements. Alternatively, those skilled in the art will recognize other equivalent embodiments such as those using conventional continuous time signal processing elements, such as analog elements. Discrete time signal processing is used because of the benefits it has over continuous time signal processing elements. These benefits include fewer components, stable deterministic performance, no aging, no drift, no adjustments, easily tunable for various engine families, high noise immunity, and self test capability.

Figure 3:
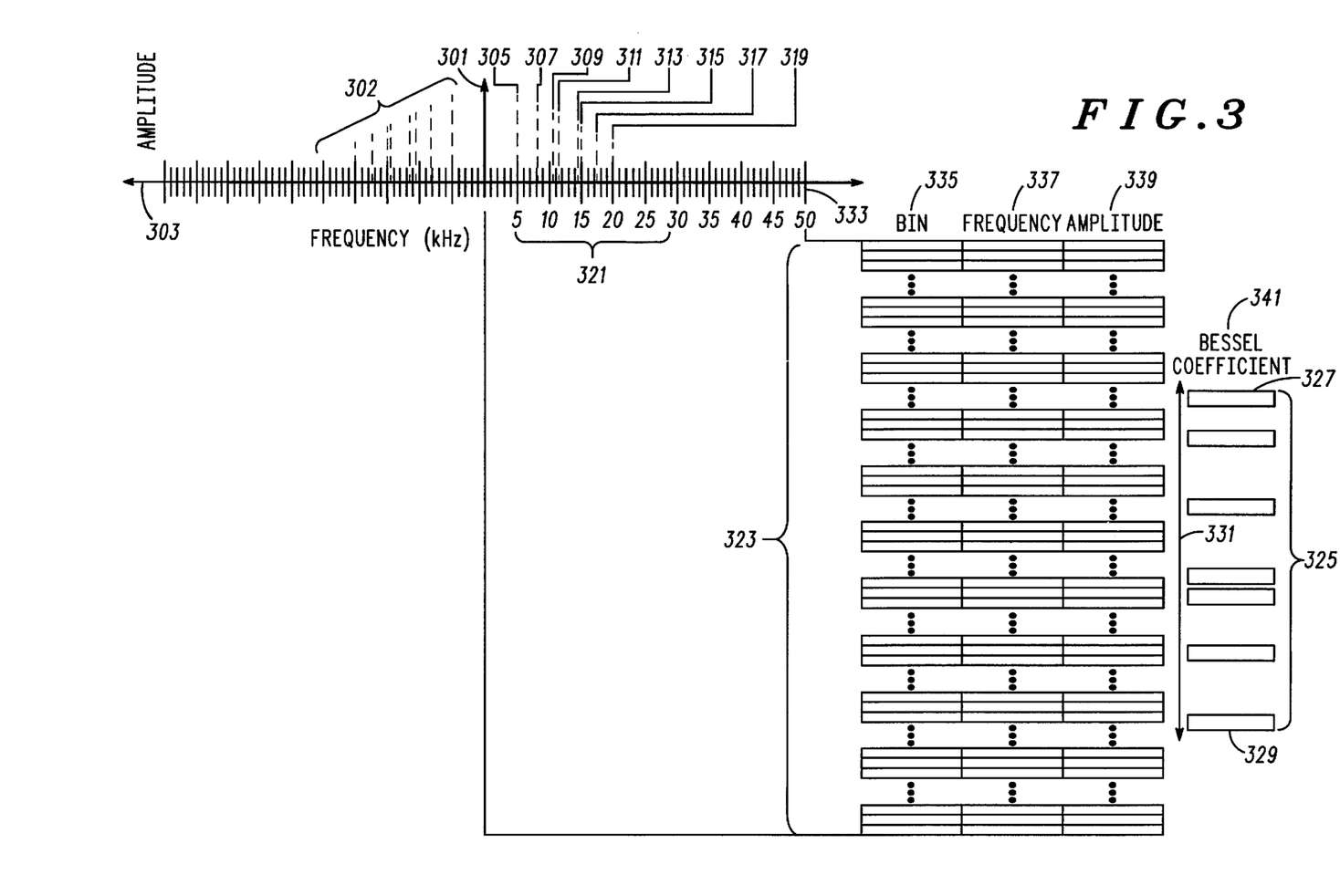
FIG. 3 is a drawing showing results from a spectral estimation step as described herein.

FIG. 3 includes a frequency distribution chart. This chart graphically illustrates processed spectral data provided from the DSP 109 synchronous proximate zero to forty degrees after top dead center of a particular cylinder's combustion event. Note that for discussion purposes, only the knocking spectra is shown on this chart. Actually, much more spectral data would be captured from the data acquisition system 105 and classified on this frequency distribution chart. In the preferred embodiment, the data 302 plotted on the left side, or the negative portion of the Y axis 301 is ignored. A portion on the right side, or positive portion, of the Y axis 301 is shown with reference numbers 305–319. This portion 305–319 represents the spectral data of interest. In order to provide this chart from the spectral energy related data sets provided from the data acquisition system 105, a broadband spectral estimate must be made. In the preferred embodiment a Fast Fourier Transform, or FFT algorithm is used. This FFT is executed on the DSP 109 as described later. The FFT, in effect, provides for a very accurate and stable multiple bandpass filter for separating the spectral energy provided from the data acquisition system 105 into bins or frequency range classifications. Those skilled in the art will recognize other spectral estimation or classification methods that are equivalently useful.

As mentioned earlier, the data samples embodied within the data sets are captured at fixed 10 $\mu$S intervals. This corresponds to a 100 kHz sample rate. In the preferred embodiment a 1024 point FFT is performed on the captured data set yielding 512 bins representing individual bandwidths of about 100 Hz each in the positive part of the spectrum. The bandwidth of each bin can be derived using the sample rate and the number of samples in, or in effect the granularity of, the FFT.

$$BW_{(bin)} = \frac{\text{sample\_rate}}{\text{FFT\_granularity}} \qquad \text{EQUATION 2}$$

$$97.65 \text{ Hz} = \frac{100 \text{ kHz}}{1,024}$$

where:
BW(bin)=bandwidth of a frequency classification or bin
sample_rate=discrete time sampling rate–here 100 kHz
FFT_granularity=number of Fast Fourier Transform points Of course, varying the sample rate or varying the FFT granularity will vary the bandwidth of the bins. It is also instructive to note the Nyquist limit of 50 kHz shown by reference number 333. Reference number 321 delimits a broadband area where a knocking behavior is expected to occur. The upper bound of the area is defined by the bandwidth of the significant terms from EQUATION 1, and the lower bound of the area is defined by 5,000 Hz which is the lowest fundamental frequency that the knock spectral component is expected to occur at.

Figure 11:
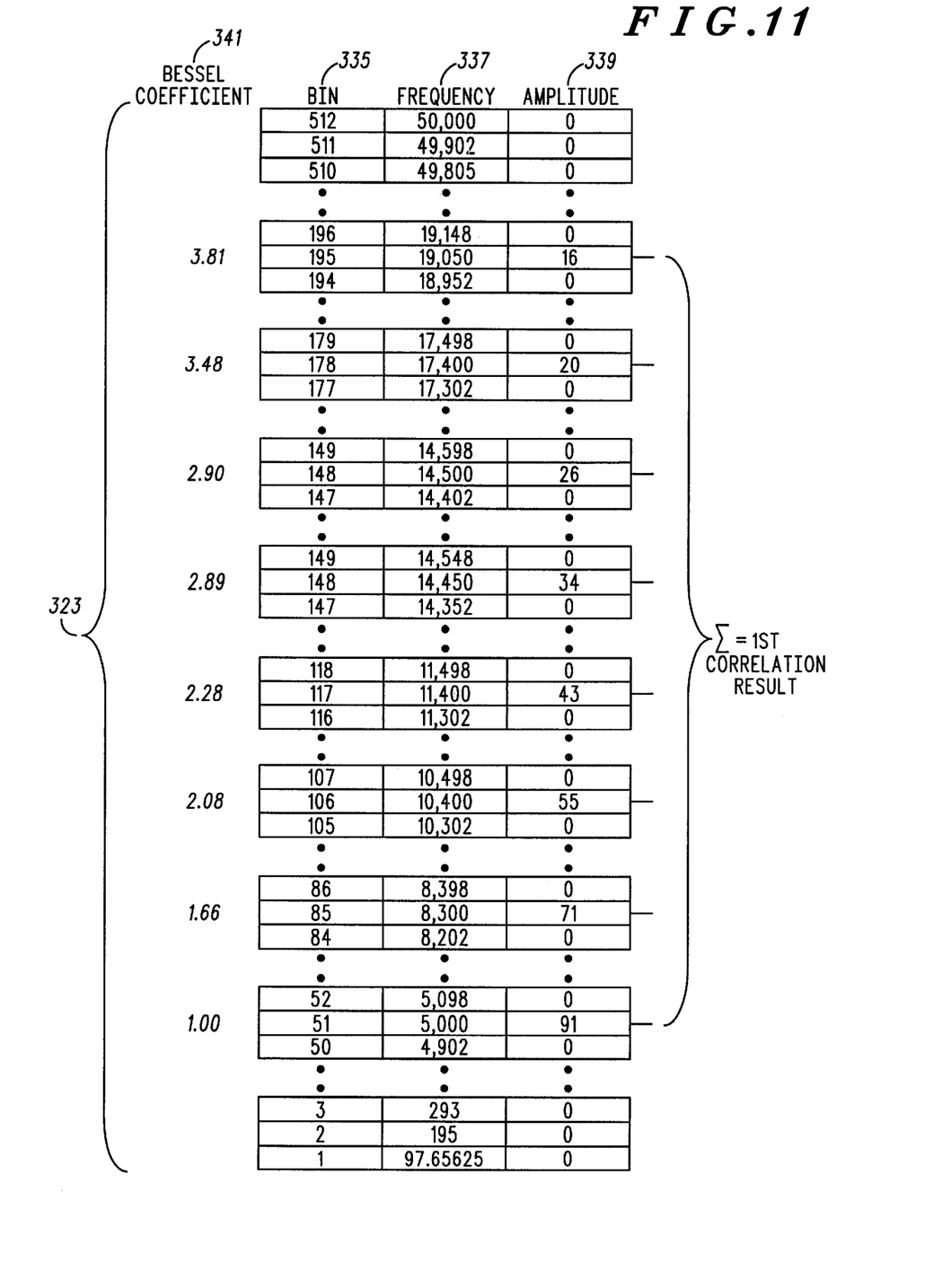
FIG. 11 is a chart detailing certain spectral characteristics introduced in FIG. 2, in accordance with a preferred embodiment of the invention.

Also, in FIG. 3 a chart 323 is shown that represents a portion of the 512 bins resulting from the FFT spectral estimate. First a bin reference number 335 is provided to index the chart. A corresponding frequency limit bin 337, and a corresponding amplitude bin 339 are also shown for each given reference number bin 335. The data in this chart 323 represents all of the spectral data estimated by the FFT derived from the engine coupled knock spectra responsive sensor 101. Details of this chart are shown in FIG. 11 and described more completely later in the discussion.

Also, a Bessel coefficient chart 341 is shown in FIG. 3. This chart 341 comprises eight bins 325 ranging from a first bin represented by reference number 329 to a bin represented by reference number 327. The graphical distance separating each of the eight bins 325 is relational to the derived Bessel coefficient ratios from the $x_{m,s}/x_{1,1}$ column in TABLE 1. Since two bins, those corresponding to the ratios 2.89 and 2.90, graphically overlap only seven bins appear to be in the set of eight bins 325. These eight bins 325 are shown adjacent to the portion of the 512 bins 323 to illustrate the correlation operation of the method described below.

The method, relying on the characteristic Bessel function relationship between the components of knock spectra, identifies a knock condition based on a matching of a behavior of the measured spectral energy to a known Bessel function model of the combustion chamber and operating conditions associated with a combustion process. This model corresponds to dimensions of a combustion chamber and an affect on resonant frequencies dependent on a temperature of gas in the chamber.

Consideration of multiple spectral locations is necessary because the magnitude of the individual spectral energy associated with a knocking condition can shift in emphasis between the characteristic frequencies on a cycle-to-cycle basis. This means that amplitudes of the respective Bessel function related frequencies while in totality will remain about the same, individually may change.

Additionally, the bandwidth associated with the individual knock spectral components needs to be sufficiently narrow to account for spectral shifts due to engine operating conditions. Shifts of a few hundred Hertz are not uncommon. The conditions related to spectral shifting include a shift in gas temperature within a combustion chamber. Beneficially, the Bessel relationship between the spectrally related components has proven to remain substantially constant under these conditions.

Figure 4:
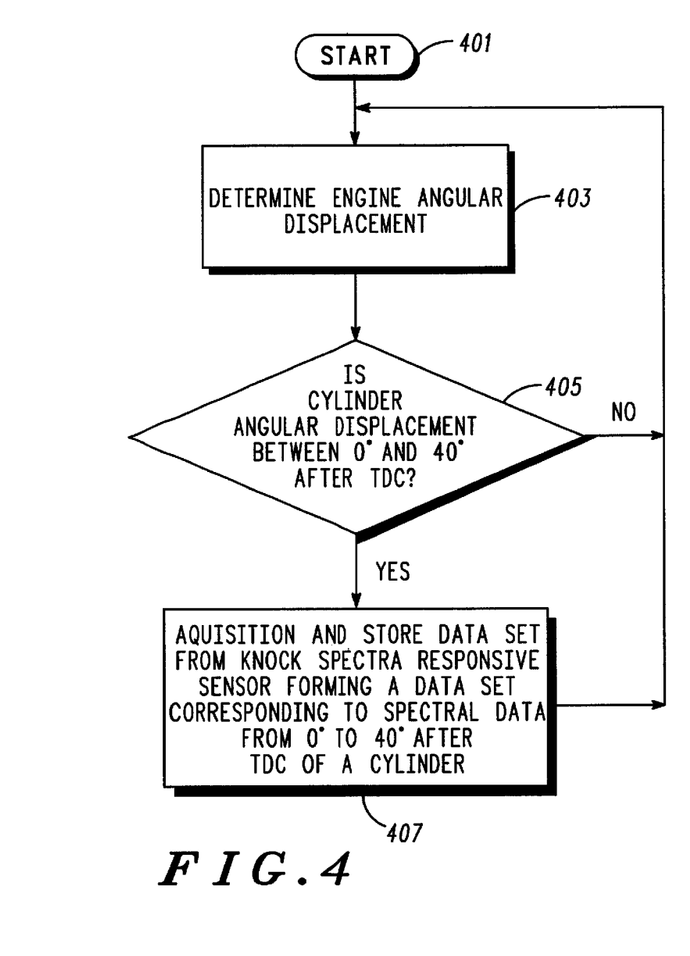
FIG. 4 is a flowchart illustrating method steps necessary for acquiring spectrally related information as described in an embodiment herein.

FIG. 4 shows a flowchart illustrating method steps necessary for acquiring spectrally related information in support of the aforementioned method. As mentioned earlier, this flow chart represents instructions microcoded into the timing controller of the data acquisition system 105. The routine executed on the timing controller starts with step 401.

In the next step 403, the timing controller determines the engine angular displacement. Then, in step 405 the timing controller determines if the individual cylinder angular displacement is between zero and forty degrees after top dead center. If it isn't, then the timing controller returns to the engine angular displacement determination step 403. If the individual cylinder angular displacement is between zero and forty degrees after top dead center, where a knocking condition is likely to occur, then step 407 is executed. In step 407 the timing controller asks the analog to digital converter to acquire and store data samples from the engine coupled knock spectra responsive sensor 101. These data samples, when sampled between zero and forty degrees after cylinder top dead center represent the data set to be processed further by the DSP 109. These steps 403, 405, and 407 are provided as described earlier, to limit the performance burden on the hardware platform, in this case primarily the DSP 109 to process only the sensory information when knock is expected to be present. Alternatively, the sensory system may be sampled regularly.

Figure 5:
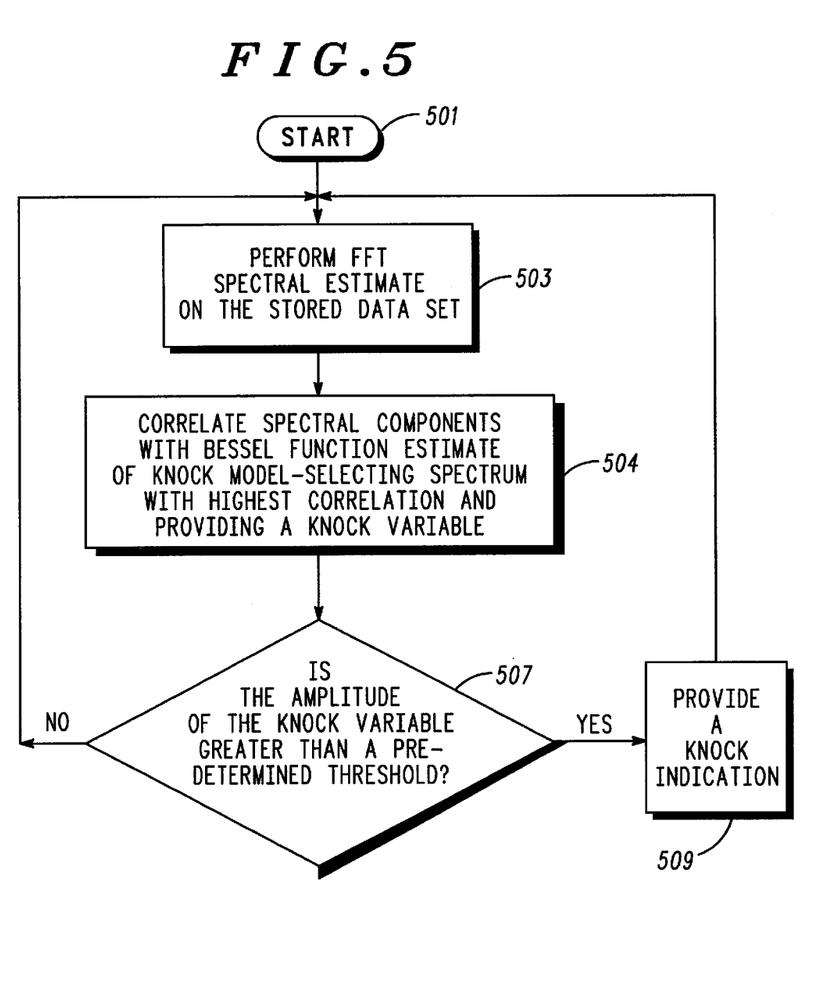
FIG. 5 is a flowchart illustrating method steps used to provide a knock indication as described herein.

Next, in FIG. 5 a knock determination method is detailed. As mentioned earlier, this flow chart represents instructions microcoded into the DSP 109. The routine is invoked at step 501. In step 503 an FFT spectral estimate is performed on the data set acquired and stored in step 407 shown in FIG. 4. A portion of the resulting spectra is represented, as described earlier, in the frequency distribution chart of FIG. 3. In actuality the frequency distribution chart will reveal the total spectrum of energy from the running engine at the time of acquisition by the data acquisition system 105. For clarity only a few frequencies of interest are shown by reference numbers 305–319. This spectra is stored in the 512 bins represented in FIG. 3 by reference number 323.

In the next step 505, a correlation of the spectral components corresponding to the relationship of the amplitudes representing the energy of particular frequency ranges in the respective bins 323 is done with the Bessel function related table 325 from FIG. 3. The spectrum with the highest correlation provides a knock variable, or estimate. This is done by aligning the first bin 329 of the Bessel function chart 341 with the 5,000 Hz bin located in the portion of bins 323 that represent the spectral data estimated by the FFT derived from the engine coupled knock spectra responsive sensor 101. Then, the next bin from the Bessel function related table 325 is aligned with a bin located in the portion of bins 323 corresponding to a frequency related to the first Bessel function ratio 1.66 from TABLE 1. In this case this frequency is 5,000 Hz·1.66 or 8,300 Hz. Then, the next bin from the Bessel function related table 325 is aligned with a bin located in the portion of bins 323 corresponding to a frequency related to the next Bessel function ratio 2.28 from TABLE 1. In this case this frequency is 5,000 Hz·2.28 or 11,400 Hz. This process is repeated for the remaining Bessel function related bins from chart 325—the last yielding alignment with a bin located in the portion of bins 323 corresponding to a frequency related to the last Bessel function ratio 3.81 from TABLE 1. In this case this frequency is 5,000 Hz·3.81 or 19,050 Hz. Then, amplitudes corresponding to the bins located aligned with the frequency biased chart 325 are summed. This summation is stored and the process repeated starting with the next bin higher than 5,000 Hz, until the highest summation, or correlation to the Bessel function biased chart 325 is found. Each of these stored variables represent the Bessel function related energy present at particular spectral locations.

To repeat the process the first bin 329 of the Bessel function chart 341 is aligned with the next, or 5,100 Hz bin located in the portion of bins 323 that represent the spectral data estimated by the FFT. Then, the next bin from the Bessel function related table 325 is aligned with a bin located in the portion of bins 323 corresponding to a frequency related to the first Bessel function ratio 1.66 from TABLE 1. In this case this frequency is 5,100 Hz 1.66 or 8,466 Hz. This process is repeated for the remaining Bessel function related bins from chart 325—the last yielding alignment with a bin located in the portion of bins 323 corresponding to a frequency related to the last Bessel function ratio 3.81 from TABLE 1. In this case this frequency is 5,100 Hz·3.81 or 19,431 Hz. Then, amplitudes corresponding to the bins located aligned with the frequency biased chart 325 are again summed. This summation is stored and the process repeated starting with the next bin higher than 5,100 Hz, until the highest summation, or correlation to the Bessel function biased chart 325 is found.

Finally, the last correlation step will use 7,500 Hz as the last fundamental frequency considered. When the (7,500 Hz–5,000 Hz)/100 Hz or 25 correlation steps are complete, then the result of the correlation step yielding the highest amplitude becomes the knock variable. This sliding correlation process is shown by reference number 331 in FIG. 3.

FIG. 11 is included to illustrate the detail of chart 323 from FIG. 3. This chart includes the eight Bessel function coefficients originally computed and shown in TABLE 1. Also it illustrates a first correlation step disclosed above. In this case the knock variable is 16+20+26+34+43+55+71+ 91=356. For brevity, the remaining ninety nine correlation steps are not shown.

Returning to FIG. 5, step 507 compares the determined knock variable to a predetermined threshold. This knock threshold is determined experimentally. If the knock variable exceeds a magnitude of the predetermined threshold, then a knock indication 111 will be provided to the engine controller 113. If the knock variable does not exceed the magnitude of the predetermined threshold, then the program returns to step 503. Note that the two software modules of FIG. 4 and FIG. 5 run simultaneously and independently on the DSP 109.

Those skilled in the relevant art will find other correlation strategies useful in extracting the Bessel function related knock behavior from the spectral information provided from the sensory system 101.

In summary, the preferred embodiment teaches an improved method for detecting knock in an internal combustion engine. This method uses a deterministic model of a combustion chamber based on a Bessel function relationship between spectral components. Acquired spectral energy associated with vibration caused by a knocking condition sensed from a running engine is correlated to the known Bessel function coefficients representing a characteristic of a combustion chamber located within the running engine. If the highest correlation found in an expected spectral range exceeds a magnitude of a predetermined threshold then a knock is indicated.

This method can detect knock at high engine speeds because it uses minimal resources by restricting consideration of spectral behavior to a range of zero to forty degrees after top dead center of a combustion event. Also, accuracy is improved because considering a limited frequency range eliminates certain spectrally related noise components outside of the considered spectral range. This includes noise which predominantly occurs at much lower and/or higher frequencies than the considered spectrum.

Additionally, this improved method requires minimum calibration and can be easily applied to different engine families because of the relatively broadband, typically 5,000 Hz–7,500 Hz, range considered for the fundamental range. This minimal calibration is also significant because as an engine wears, or component parts are changed in the field, the knock determination method by the nature of its design will automatically adapt.

In a first alternative embodiment, a sliding FFT method identifies a knock condition based on a significant transition in spectral energy between a real time measurement of energy associated with the characteristic knock spectra and a trended measurement of energy associated with the characteristic knock spectra. The FFT is in effect sliding because the spectral data filtered, or estimated in the FFT is provided to the FFT step as a periodically moving window. This time based strategy minimizes the impact of various dynamic effects because it continually looks for a knocking condition. In the case of the alternative embodiments the FFT granularity is coarser than the granularity used in the preferred embodiment. This is done because the data sets can be substantially smaller since they are continuously overlapping in time. Also, coarser bins, or frequency classifications are desirable because the moving correlation function described in the preferred embodiment is replaced with a broader band fixed estimation approach. The granularity can be determined as before from EQUATION 2 as 100 kHz/128 or 781.25 Hz bins.

The first alternative embodiment continuously acquires data sets that have a fixed quantity of data samples from a running engine. These data sets may be crank angle windowed as described in the preferred embodiment, or continuously acquired as described here. These data sets have a portion of the fixed quantity of data samples provided from a previously acquired periodically overlapping data set. The data sets contain spectral energy characteristic of a combustion process in the running engine. A knock variable composed of a summation of magnitudes of individual spectral components corresponding to characteristic knock spectra extracted from the fixed quantity of data samples is provided. Each of the acquired time overlapping data sets have a portion of the fixed quantity of data samples provided from a previously acquired time overlapping data set, and another portion having later in time sampled data samples.

Then, a knock is indicated when the knock variable for a current one of the time overlapping data sets exceeds a magnitude derived from the knock variable from at least one previous one of the time overlapping data sets. In this embodiment the derivation of the knock variable includes summing the magnitudes of the individual spectral components corresponding to characteristic knock spectra. In another case, a plurality of data sets are considered for gating the final threshold step.

In a second alternative embodiment a similar overlapping time based strategy is employed with consideration of an additional adaptive threshold based on noise, or a non-knock related energy content of the acquired signal 103. The second alternative embodiment method acquires spectral energy from a running engine using the aforementioned sliding FFT method.

Spectral energy is acquired in the form of time overlapping data sets having a fixed quantity of data samples. Each of the acquired time overlapping data sets have a portion of the fixed quantity of data samples provided from a previously acquired time overlapping data set, and another portion having later in time sampled data samples.

Then, for each of the time overlapping data sets a knock variable derived from magnitudes of individual spectral components associated with characteristic knock spectra is extracted from the fixed quantity of data samples.

Then, for each of the time overlapping data sets a non-knock variable is derived from a scaled summation of magnitudes of individual spectral components associated with characteristic non-knock spectra. This non-knock variable is extracted from the fixed quantity of data samples. A knock indication is provided when the knock variable for a current one of the time overlapping data sets exceeds a magnitude derived from the knock variable from at least one previous one of the time overlapping data sets, and the knock variable exceeds a magnitude of the non-knock variable for a predetermined time.

The spectral behavior of non-knock, or noise, related spectra results from mechanical noise such as piston slap, valves transitioning from open to closed or closed to open etc.

Conveniently, the frequencies selected to represent the non-knock variable are interdigitated with the characteristic knock frequencies. This assures a robust prediction of noise—thus improved knock detection because of the proximal location between the knock and non-knock frequencies. Some prior art systems measure noise broadband and in a separate spectral location distal from the knock spectra. In the case of the prior art approach various low and high frequency systemic noise sources could cause erroneous detection of a knocking condition. The precise location and bandwidth of the knock frequencies and non-knock frequencies is determined empirically. In this embodiment these relationships are disclosed in the following table.

TABLE 3

| frequency band | lowest frequency | highest frequency |
| --- | --- | --- |
| knock 1 | 4,687.5 Hz | 6,250 Hz |
| non-knock 1 | 6,250 Hz | 7,812.5 Hz |
| knock 2 | 7,812.5 Hz | 9,375 Hz |
| non-knock 2 | 10,156.25 Hz | 11,718.75 Hz |
| knock 3 | 11,718.75 Hz | 13,281.25 Hz |
| non-knock 3 | 13,281.25 Hz | 14,843.75 Hz |
| knock 4 | 15,625 Hz | 17,187.5 Hz |
| non-knock 4 | 17,187.5 Hz | 18,750 Hz |
| knock 5 | 18,750 Hz | 21,093.75 Hz |

Remembering that the chosen granularity is 781.25 Hz based on 128 point FFTs one can observe that the various bandwidths delimited by the above stated lowest and highest frequency columns are integer multiples of this granularity. Notice also that the frequency covered by the FFT for the various knock and non-knock bands are non-overlapping. This is possible because of the abrupt frequency discrimination possible with the all digital implementation.

In a third alternative embodiment, the amplitude vs. time based strategy is replaced with a time based statistical approach. This third alternative embodiment method acquires spectral energy from a running engine using the aforementioned sliding FFT method. A knock variable is provided, associated with a statistical variance of amplitude over time of individual spectral components associated with characteristic knock spectra. Then, a knock indication is provided when the knock variable exceeds a magnitude of a predetermined threshold. This threshold is determined experimentally.

The details of these alternative embodiments will be disclosed below, but first an introduction of the remaining system components will be disclosed as follows.

Figure 2:
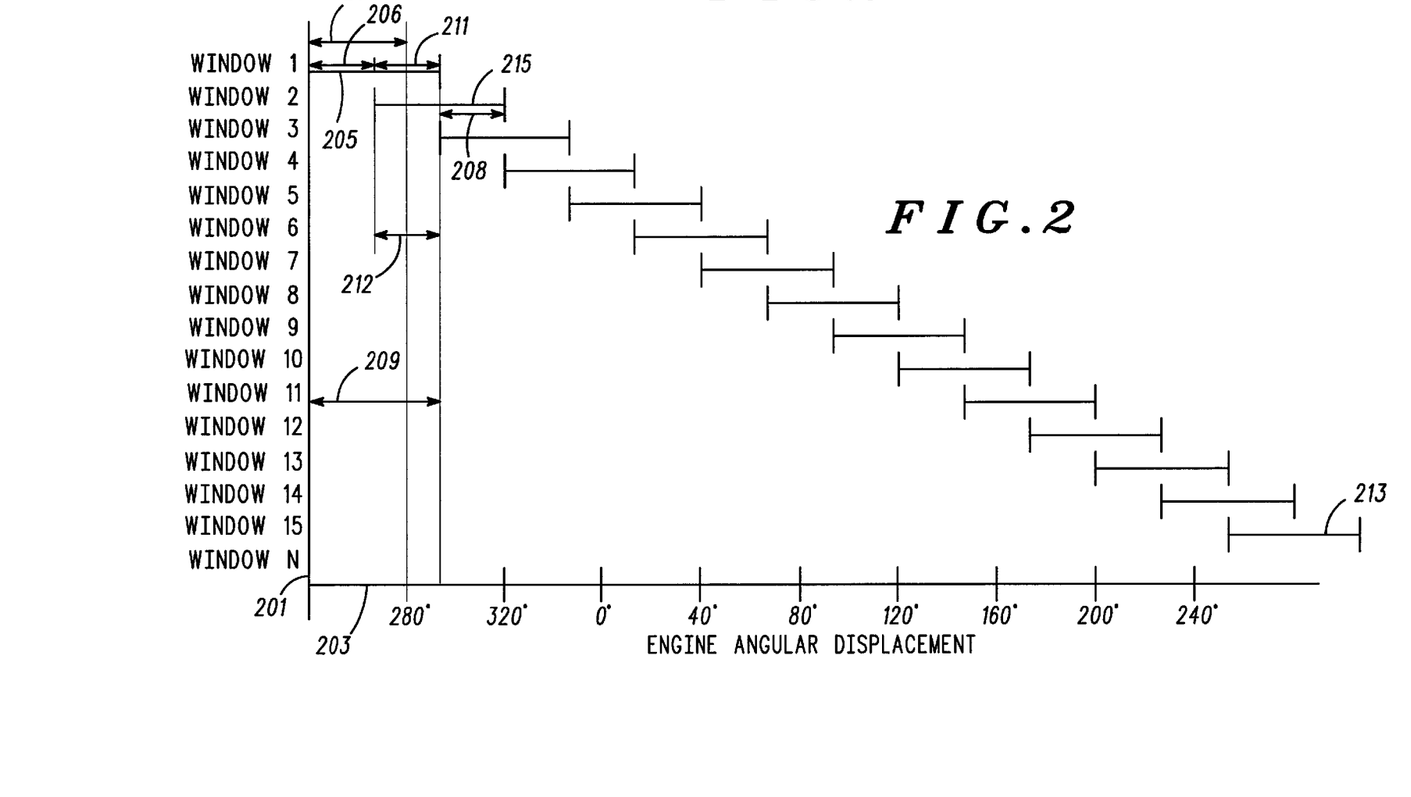
FIG. 2 is a chart showing a sampling technique described in alternative embodiments herein.

FIG. 2 reveals a chart showing a sampling plan executed by the timing controller of the data acquisition system 105. This sampling plan provides a time progressive series of data sets 205, 215, and 213. An X-axis 203 shows a progressive engine angular displacement A Y-axis 201 shows a timing diagram for continuously acquiring periodically overlapping data sets having a fixed quantity of data samples independent of speed, or a rate of angular displacement, of the running engine. Reference number 205 shows a first window, WINDOW 1. During the period that this window is active the analog to digital converter acquires 128 data samples at a fixed rate, high enough not to violate the Nyquist limit, and classifies the data samples into a first data set. Note that reference number 207 shows forty degrees of engine angular displacement. In this figure the engine is running at 6,000 RPM. During this period shown by reference number 207 111 data samples of the 128 data samples belonging to the first data set are acquired. At this engine speed it takes forty six degrees of engine angular displacement to acquire 128 data samples. A first portion 206 of this first data set 205 is comprised of a first quantity, in this case 64, data samples. This data set 205 also has a second portion 211 comprised of a second quantity, again 64, data samples.

A second window, WINDOW 2, provides a later in time data set shown by reference number 215 and is shown overlapping the first window 205 by 50%. This 50% overlap corresponds in this case to 64 data samples. This later in time data set 215 has a first portion denoted by reference number 212 comprised of the same data samples contained in the second portion 211 of the data set 205. The later in time data set 215 has another second portion 208 comprised of a third quantity of the data samples. Since these data sets are of a fixed size the third quantity is also 64.

Thus, the second, or later in time, data set will be comprised of the last 64 data samples from the first data set and 64 new data samples. This overlapping process continues repeating every 64 data samples beyond the last window shown, WINDOW n shown by reference number 213, ad infinitum. The rational for acquiring these overlapping data sets is so that when analyzed, a knocking condition asynchronous with this sampling plan will not be lost by the synchronous nature of this sampling plan.

Figure 6:
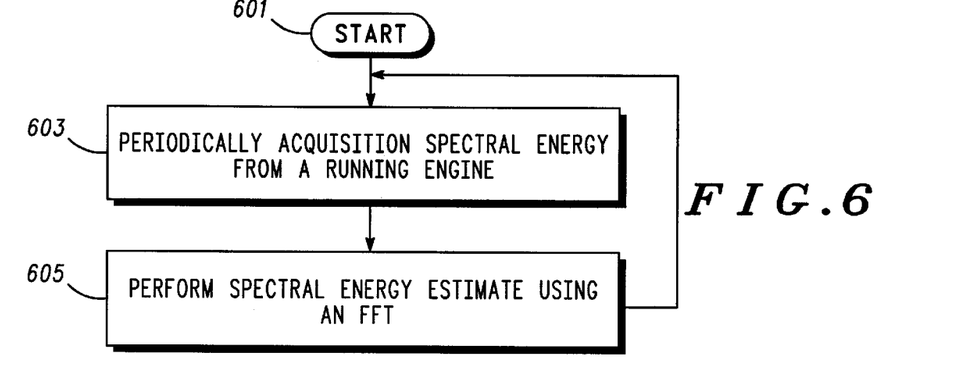
FIG. 6 is a flowchart showing method steps corresponding to the acquiring of spectral data in an embodiment described herein.

FIG. 6 shows a flow chart representing microcoding of both the timing controller from the data acquisition system 105 and the DSP 109. The process is started at step 601. In step 603 the data acquisition system 105 acquires the data sets with overlapping data samples and provides the data sets to the DSP 109. Note although the example here uses a 50% overlapping schedule other scheduling plans may be used. In step 605 the DSP 109 performs a spectral energy estimate using an FFT. The resulting data is stored for later retrieval. This figure is the common front-end to the three alternative embodiments described hereinafter and was designed accordingly.

Figure 7:
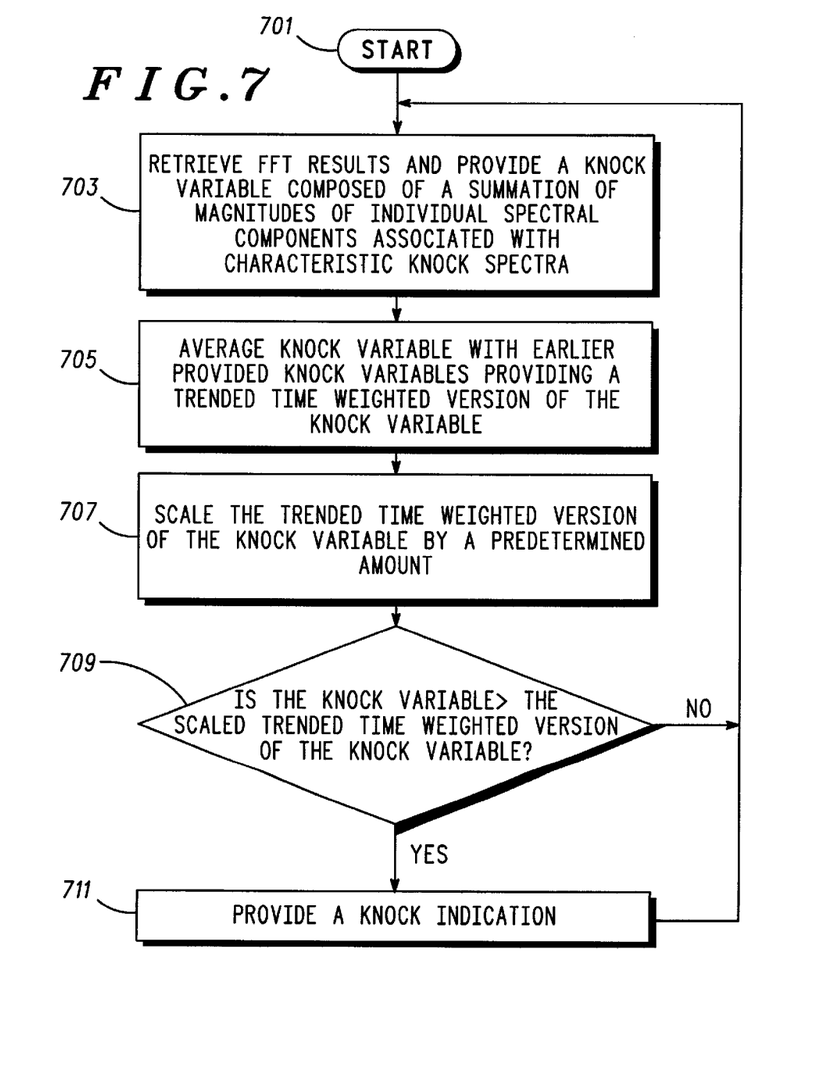
FIG. 7 is a flowchart illustrating a method for providing a knock indication in accordance with spectral energy acquired by the method steps shown in the flowchart in FIG. 6.

FIG. 7 shows the additional method steps associated with the first alternative embodiment. Note that the software modules outlined in FIGS. 6 and 7 run simultaneously. This flow chart represents method steps microcoded into the DSP 109. It is invoked at step 701.

In step 703 the FFT results are retrieved and a knock variable is provided composed of a summation of magnitudes of individual spectral components associated with characteristic knock spectra.

In step 705 the newly provided knock variable is averaged with previously provided knock variables thus providing a trended time weighted version of the knock variable used later as a dynamic threshold.

In step 707 the trended time weighted version of the knock variable is scaled by a predetermined amount. This amount is determined empirically. It is convenient to affect the knock determination method by scaling this trended time weighted version of the knock variable even though there is no direct relationship that exists between the empirical determination and the trended time weighted version of the knock variable. The empirical determination of the scaling factor may include consideration of engine performance characteristics such as emissions and power output. In other words, a higher level of knock may be accepted to accommodate a higher power output level from the engine.

In step 709 the knock variable, provided in step 703, is compared to the scaled trended time weighted version of the knock variable, provided in step 707. If the knock variable does not exceed the scaled trended time weighted version of the knock variable then the routine repeats starting at step 703. If the knock variable exceeds the scaled trended time weighted version of the knock variable then step 711 is executed.

In step 711 a knock indication 111 is provided at the output of the DSP 109 to the engine controller 113 and the routine repeats starting at step 703.

This sliding, overlapping FFT approach unburdens the data acquisition system 105 from synchronizing with engine angular displacement Another advantage of this first alternative embodiment, and also the other alternative embodiments reliant on the sliding FFT approach, is that since the 128 point FFT has so few bins it is very resource efficient.

Figure 8:
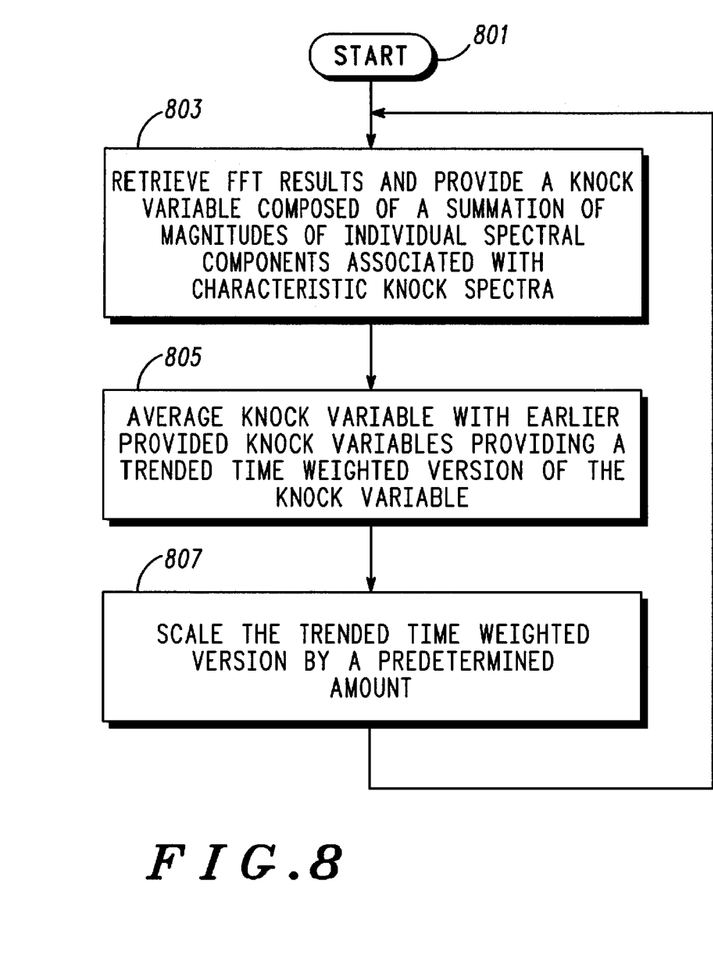
FIG. 8 is a flowchart illustrating certain method steps in accordance with an embodiment described herein.
Figure 9:
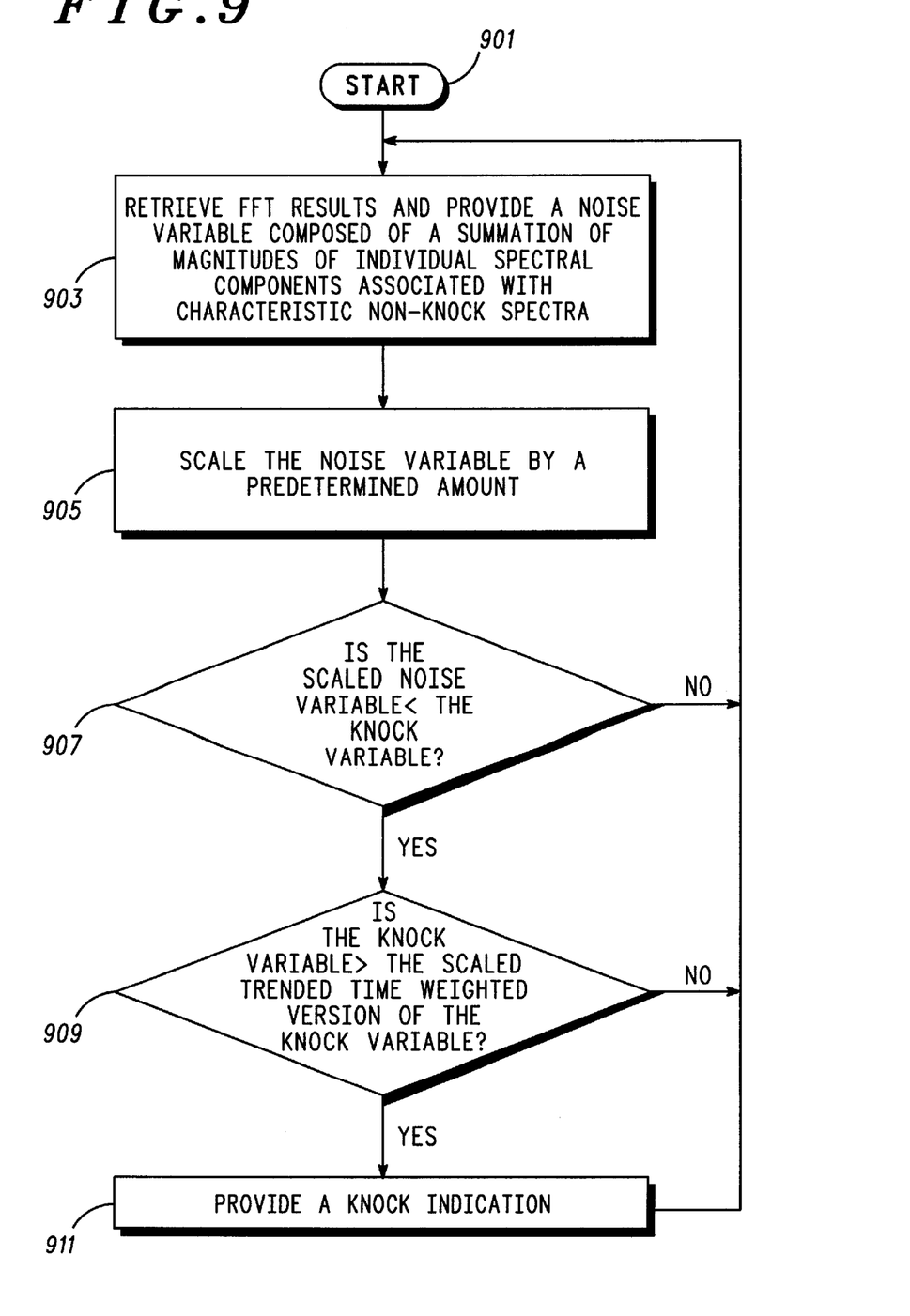
FIG. 9 is a flowchart illustrating certain method steps corresponding to a method described herein for providing a knock indication.

FIGS. 8 and 9 show the additional method steps associated with the second alternative embodiment. These flow charts represent method steps microcoded into the DSP 109. Note that the software modules outlined in FIGS. 6, 8, and 9 run simultaneously. First FIG. 8 will be described. This routine is invoked at step 801.

In step 803 the FFT results are retrieved and a knock variable is provided composed of a summation of magnitudes of individual spectral components associated with characteristic knock spectra.

In step 805 the newly provided knock variable is averaged with previously provided knock variables thus providing a trended time weighted version of the knock variable used later as a dynamic threshold.

In step 807 the trended time weighted version of the knock variable is scaled by a predetermined amount. This amount is determined empirically and for substantially the same reasons as described earlier in the preferred embodiment. The routine then re-executes starting with step 803. Note that steps 803–807 correspond directly to steps 703–707.

Concurrent with the steps in FIGS. 6 and 8, the steps in FIG. 9 are executing. In step 903 the FFT results are retrieved and a non-knock variable is provided composed of a summation of magnitudes of individual spectral components associated with characteristic noise, or non-knock related spectra. This spectra is taken from bins interlaced with characteristic knock bins.

In step 905 the non-knock variable provided in step 903 is scaled by a predetermined amount. This amount is determined experimentally.

Then, in step 907 the scaled non-knock variable is compared to the knock variable provided in step 803 of FIG. 8. If the scaled non-knock variable has a magnitude greater than a magnitude of the knock variable then the routine re-executes starting at step 903. If the scaled non-knock variable has a magnitude less than a magnitude of the knock variable, then the next step 909 is executed.

In step 909 the knock variable provided in step 803 of FIG. 8 is compared to the scaled trended time weighted version of the knock variable provided in step 807 of FIG. 8. If the knock variable has a magnitude less than a magnitude of the scaled trended time weighted version of the knock variable, then the routine re-executes starting at step 903. If the knock variable has a magnitude greater than the magnitude of the scaled trended time weighted version of the knock variable, then the next step 911 is executed.

In step 911 a knock indication 111 is provided at the output of the DSP 109 to the engine controller 113 and the routine repeats starting at step 903.

With the addition of a non-knock related variable certain systemic noise can be canceled thus leading to a more accurate and robust knock detection method as disclosed in this second alternative embodiment.

Figure 10:
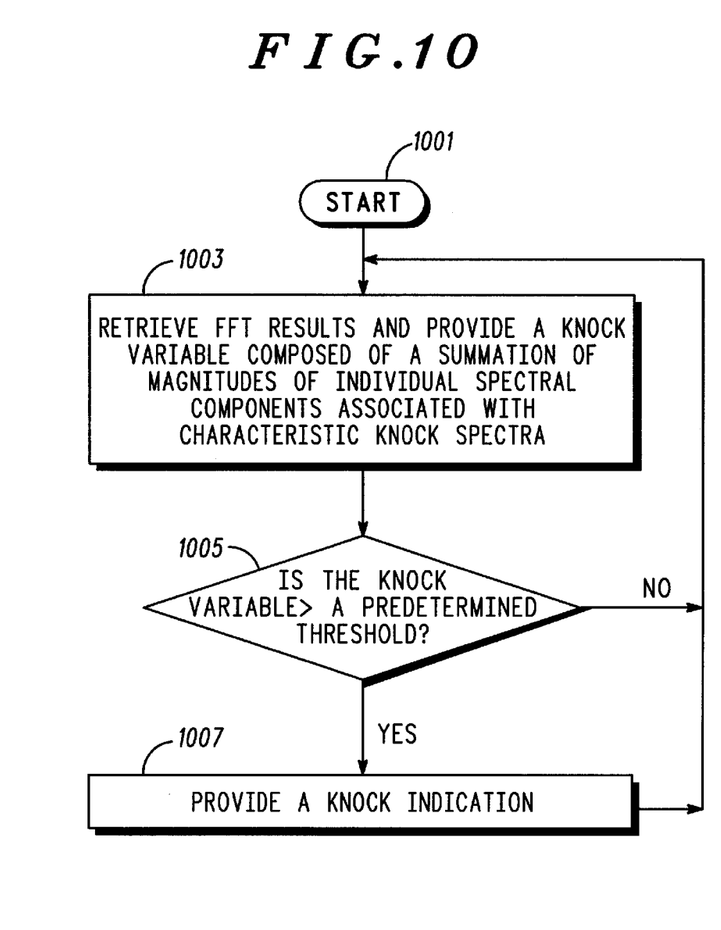
FIG. 10 is a flowchart showing method steps as described in an embodiment herein.

FIG. 10 shows the additional method steps associated with the third alternative embodiment. Note that the software modules outlined in FIGS. 6 and 10 run simultaneously. The flow chart of FIG. 10 represents method steps microcoded into the DSP 109. It is invoked at step 1001.

In step 1003 the FFT results are retrieved and a knock variable is provided composed of a variance of magnitudes of individual spectral components associated with characteristic knock spectra.

In step 1005 the newly provided knock variable is compared to a predetermined threshold. This threshold is determined experimentally. If a magnitude of the knock variable does not exceed a magnitude of the predetermined threshold, then the routine is re-executed starting at step 1003. If knock variable exceeds a magnitude of the predetermined threshold, then step 1007 is executed.

In step 1007 a knock indication 111 is provided at the output of the DSP 109 to the engine controller 113 and the routine repeats starting at step 1003.

This third alternative embodiment measures a statistical relationship of the knock related spectral components. While variance is used here other statistical relationships may prove useful.

The alternative embodiments teach improved methods for detecting knock in an internal combustion engine. These methods can detect knock at high engine speeds because they use minimal resources by restricting consideration of spectral behavior to small data sets. Continuous sampling characteristic of these alternative methods simplifies the control of the data acquisition mechanism compared to a crank angle windowing approach. However, adding back this crank angle windowing mechanism may provide for a more accurate knock detection method.

In summary, several improved methods for determining a knocking condition in a running engine have been described. These methods include improvement in reliability, and accuracy, detection of knock at high engine speeds, require minimum calibration, and can be easily applied to different engine families.

Although the embodiments described herein teach the application of method steps on a hardware platform, a system may be easily constructed by those of ordinary skill in the art to emulate the method steps—thus yielding the same benefits taught in these embodiments.

What is claimed is:

1. A method of knock detection comprising the steps of:
   acquiring spectral energy associated with vibration caused by a knocking condition sensed from a running engine;
   providing a knock variable derived from magnitudes of individual spectral components corresponding to characteristic knock spectra associated with said acquired spectral energy; and
   providing a knock indication when said knock variable exceeds a magnitude of a trended time weighted version of said knock variable by a predetermined magnitude.

2. A method in accordance with claim 1 wherein said step of providing a knock variable includes a step of estimating with a Fast Fourier Transform the magnitudes of individual spectral components from an overlapping set of data provided by said step of periodically acquiring spectral energy.

3. A method in accordance with claim 1 wherein said step of periodically acquiring spectral energy associated with vibration caused by a knocking condition includes periodically acquiring spectral energy at a predetermined fixed rate.

4. A method in accordance with claim 3 wherein said step of periodically acquiring spectral energy associated with vibration caused by a knocking condition at a predetermined fixed rate includes, periodically acquiring spectral energy at a predetermined fixed rate independent of a rate of angular displacement of said running engine.

5. A method in accordance with claim 1 wherein said step of providing a knock variable includes providing a knock variable derived from a statistical variance of magnitude over time of individual spectral components associated with characteristic knock spectra; and
   providing a knock indication when said knock variable exceeds a statistical variance of magnitude of a trended time weighted version of said knock variable by a predetermined magnitude.

6. A method of knock detection comprising the steps of:
acquiring time overlapping data sets having a fixed quantity of data samples from a running engine, each of said acquired time overlapping data sets having a portion of the fixed quantity of data samples provided from a previously acquired time overlapping data set, and another portion having later in time sampled data samples, said acquired time overlapping data sets containing spectral energy associated with a combustion process in said running engine;

providing for each of said time overlapping data sets a knock variable derived from magnitudes of individual spectral components associated with characteristic knock spectra extracted from said fixed quantity of data samples; and providing a knock indication when said knock variable for a current one of said time overlapping data sets exceeds a magnitude derived from said knock variable from at least one previous one of said time overlapping data sets.

7. A method in accordance with claim 6 wherein said step of providing a knock indication includes providing a knock indication when said knock variable for said current one of said time overlapping data sets exceeds a magnitude derived from said knock variable from a plurality of said time overlapping data sets acquired previous to said current one of said time overlapping data sets.

8. A method of knock detection comprising the steps of:
acquiring data samples representing spectral energy associated with vibration caused by a knocking condition sensed from a running engine;

providing a time progressive series of data sets, one of said data sets having a first portion comprised of a first quantity of said data samples, said one of said data sets having a second portion comprised of a second quantity of said data samples, and a later in time data set having another first portion comprised of the same data samples contained in said second portion of said one of said data sets, said later in time data set having another second portion comprised of a third quantity of said data samples;

providing a knock variable derived from a summation of magnitudes of individual spectral components associated with characteristic knock spectra extracted from said data samples in said later in time data set; and providing a knock indication when said provided knock variable exceeds a magnitude derived from a summation of magnitudes of individual spectral components associated with characteristic knock spectra extracted from said data samples associated with said one of said time progressive series of data sets.

9. A method in accordance with claim 8 wherein said first quantity of said data samples is equal in quantity to said second quantity of said data samples.

10. A method in accordance with claim 8 wherein said step of acquiring data samples includes acquiring data samples at a predetermined fixed rate independent of an angular displacement of said running engine.

11. A method of knock detection comprising the steps of:
acquiring time overlapping data sets having a fixed quantity of data samples from a running engine, each of said acquired time overlapping data sets having a portion of the fixed quantity of data samples provided from a previously acquired time overlapping data set, and another portion having later in time sampled data samples, said acquired time overlapping data sets containing spectral energy associated with vibration caused by a knocking condition sensed from a running engine;

providing for each of said time overlapping data sets a knock variable derived from magnitudes of individual spectral components associated with characteristic knock spectra extracted from said fixed quantity of data samples;

providing for each of said time overlapping data sets a non-knock variable derived from a scaled summation of magnitudes of individual spectral components associated with characteristic non-knock spectra extracted from said fixed quantity of data samples; and providing a knock indication when said knock variable for a current one of said time overlapping data sets exceeds a magnitude derived from said knock variable from at least one previous one of said time overlapping data sets, and said knock variable exceeds a magnitude of said non-knock variable for a predetermined time.

12. A method in accordance with claim 11 wherein said step of periodically acquiring spectral energy associated with vibration caused by a knocking condition at a predetermined fixed rate includes, periodically acquiring spectral energy associated with vibration caused by a knocking condition at a predetermined fixed rate independent of an angular displacement of said running engine.

13. A method in accordance with claim 11 wherein said individual spectral components associated with characteristic non-knock spectra are located in frequency interdigitated with said individual spectral components associated with characteristic knock spectra.

14. A knock detection system comprising:
means for acquiring spectral energy associated with vibration caused by a knocking condition sensed from a running engine;

means for providing a knock variable derived from magnitudes of individual spectral components corresponding to characteristic knock spectra associated with said acquired spectral energy; and means for providing a knock indication when said knock variable exceeds a magnitude of a trended time weighted version of said knock variable by a predetermined magnitude.

15. An system in accordance with claim 14 wherein said means for providing a knock variable includes Fast Fourier Transform means to estimate the magnitudes of individual spectral components from an overlapping set of data provided by said means for periodically acquiring spectral energy.

16. An system in accordance with claim 15 wherein said means for periodically acquiring spectral energy associated with vibration caused by a knocking condition at a predetermined fixed rate includes means for periodically acquiring spectral energy associated with vibration caused by a knocking condition at a predetermined fixed rate independent of a rate of angular displacement of said running engine.

17. A knock detection system comprising:
means for acquiring time overlapping data sets having a fixed quantity of data samples from a running engine, each of said acquired time overlapping data sets having a portion of the fixed quantity of data samples provided from a previously acquired time overlapping data set, and another portion having later in time sampled data samples, said acquired time overlapping data sets containing spectral energy associated with a combustion process in said running engine;

means for providing for each of said time overlapping data sets a knock variable derived from magnitudes of individual spectral components associated with characteristic knock spectra extracted from said fixed quantity of data samples; and means for providing a knock indication when said knock variable for a current one of said time overlapping data sets exceeds a magnitude derived from said knock variable from at least one previous one of said time overlapping data sets.

18. An system in accordance with claim 17 wherein said means for providing a knock indication includes means for providing a knock indication when said knock variable for said current one of said time overlapping data sets exceeds a magnitude derived from said knock variable from a plurality of said time overlapping data sets acquired previous to said current one of said time overlapping data sets.

19. An system in accordance with claim 18 wherein said means for providing a knock variable derived from said periodically acquired spectral energy includes Fast Fourier Transform means.

20. A knock detection system comprising:

means for acquiring data samples representing spectral energy associated with vibration caused by a knocking condition sensed from a running engine;

means for providing a time progressive series of data sets, one of said data sets having a first portion comprised of a first quantity of said data samples, said one of said data sets having a second portion comprised of a second quantity of said data samples, and a later in time data set having another first portion comprised of the same data samples contained in said second portion of said one of said data sets, said later in time data set having another second portion comprised of a third quantity of said data samples;

means for providing a knock variable derived from magnitudes of individual spectral components associated with characteristic knock spectra extracted from said data samples in said later in time data set; and means for providing a knock indication when said provided knock variable exceeds a magnitude derived from a summation of magnitudes of individual spectral components associated with characteristic knock spectra extracted from said data samples associated with at least one said one of said time progressive series of data sets.

21. A system in accordance with claim 20 wherein said means for providing a knock variable includes means for providing a knock variable derived from a statistical variance of magnitudes of individual spectral components associated with characteristic knock spectra extracted from said data samples in said later in time data set; and means for providing a knock indication when said provided knock variable exceeds a magnitude derived from a statistical variance of magnitudes of individual spectral components associated with characteristic knock spectra extracted from said data samples associated with at least one said one of said time progressive series of data sets.

22. A system in accordance with claim 20 wherein said individual spectral components associated with characteristic non-knock spectra are located in frequency interdigitated with said individual spectral components associated with characteristic knock spectra.

23. A method of knock detection comprising the steps of:

acquiring spectral energy associated with vibration caused by a knocking condition sensed from a running engine;

providing, from said acquired spectral energy, a knock variable derived from magnitudes of spectral components related by ratios corresponding to Bessel function coefficients representing a characteristic of a combustion chamber located within said running engine; and providing a knock indication when said knock variable exceeds a magnitude of a predetermined threshold.

24. A method in accordance with claim 23 wherein said step of acquiring spectral energy associated with vibration caused by a knocking condition sensed from a running engine includes acquiring spectral energy associated with vibration caused by a knocking condition sensed from a running engine synchronous with cylinder combustion about zero degrees to forty degrees after top dead center.

25. A method of knock detection comprising the steps of:

periodically acquiring spectral energy associated with vibration caused by a knocking condition sensed from a running engine and providing a data set having a fixed quantity of data samples;

spectrally estimating an energy content of said data set and providing a multitude of individual coefficients corresponding to an individual spectral energy content of spectrally related component parts of said data set;

correlating said multitude of coefficients to a Bessel function related estimation representing a characteristic of a combustion chamber located within said running engine, and providing a knock energy variable derived from a portion of said data set having a highest correlation with the Bessel function related estimation; and providing a knock indication when said knock energy variable exceeds a magnitude of a predetermined threshold.

26. A knock detection system comprising:

means for periodically acquiring spectral energy associated with vibration caused by a knocking condition sensed from a running engine;

means for providing a knock variable derived from said periodically acquired spectral energy, said knock variable composed of a summation of magnitudes of spectral components related to each other by ratios corresponding to Bessel function coefficients representing a characteristic of a combustion chamber located within said running engine; and means for providing a knock indication when said knock variable exceeds a magnitude of a predetermined threshold.

27. A knock detection system comprising:

a vibration sensor for acquiring spectral energy associated with vibration caused by a knocking condition sensed from a running engine;

a spectral filtering device for providing a knock variable derived from magnitudes of individual spectral components corresponding to characteristic knock spectra associated with the acquired spectral energy; and a comparator for providing a knock indication when the knock variable exceeds a magnitude of a trended time weighted version of the knock variable by a predetermined magnitude.

28. A knock detection system comprising:

a circuit for acquiring time overlapping data sets having a fixed quantity of data samples from a running engine, each of said acquired time overlapping data sets having a portion of the fixed quantity of data samples provided from a previously acquired time overlapping data set, and another portion having later in time sampled data samples, said acquired time overlapping data sets containing spectral energy associated with a combustion process in said running engine;

a spectral filtering device for providing, for each of said time overlapping data sets, a knock variable derived from magnitudes of individual spectral components associated with characteristic knock spectra extracted from said fixed quantity of data samples; and a comparator for providing a knock indication when said knock variable for a current one of said time overlapping data sets exceeds a magnitude derived from said knock variable from at least one previous one of said time overlapping data sets.

* * * * *